US007550167B1

(12) United States Patent
Widmer et al.

(10) Patent No.: US 7,550,167 B1
(45) Date of Patent: Jun. 23, 2009

(54) GRAPEFRUIT-JUICE-BASED BEVERAGE PREPARATION METHOD FOR THE ELIMINATION OF DRUG ABSORPTION INTERACTION

(75) Inventors: Wilbur W. Widmer, Winter Haven, FL (US); William S. Stinson, Jr., Lakeland, FL (US); Martin Klim, Auburndale, FL (US); Patricia Q. Klim, legal representative, Auburndale, FL (US)

(73) Assignee: Florida Department of Citrus, Lakeland, FL (US)

( * ) Notice: Subject to any disclaimer, the term of this patent is extended or adjusted under 35 U.S.C. 154(b) by 708 days.

(21) Appl. No.: 10/933,199

(22) Filed: Sep. 2, 2004

(51) Int. Cl.
*A23L 2/80* (2006.01)

(52) U.S. Cl. .................. 426/422; 426/599; 426/490; 426/495

(58) Field of Classification Search ............... 426/599, 426/422, 490, 495
See application file for complete search history.

(56) References Cited

U.S. PATENT DOCUMENTS

| | | | |
|---|---|---|---|
| 4,439,458 A * | 3/1984 | Puri ..................... 426/330.5 |
| 5,817,354 A * | 10/1998 | Mozaffar et al. ............ 426/271 |
| 5,885,638 A * | 3/1999 | Takayanagi et al. ......... 426/271 |
| 6,045,842 A | 4/2000 | Mozaffar et al. |
| 6,054,168 A * | 4/2000 | Lioutas et al. .............. 426/599 |
| 6,054,490 A | 4/2000 | Sime et al. |
| 6,160,006 A | 12/2000 | Edwards et al. |
| 6,476,066 B1 | 11/2002 | Harris |
| 6,528,099 B1 | 3/2003 | Garti et al. |
| 6,534,107 B1 * | 3/2003 | Ma et al. ................. 426/330.5 |
| 6,544,577 B1 * | 4/2003 | Chu et al. .................... 426/599 |
| 7,108,887 B2 * | 9/2006 | Chu et al. .................... 426/599 |
| 7,238,379 B2 * | 7/2007 | Lang ......................... 426/542 |
| 2002/0022599 A1 | 2/2002 | Synold et al. |
| 2002/0061836 A1 | 5/2002 | Forman et al. |
| 2002/0192632 A1 | 12/2002 | Hei et al. |
| 2003/0064144 A1 | 4/2003 | Chu et al. |
| 2003/0180823 A1 | 9/2003 | Leyland-Jones |
| 2004/0081734 A1 | 4/2004 | Lang |

OTHER PUBLICATIONS

Lee et al. Food Chemistry. vol. 82, pp. 177-180. Aug. 2003.*

* cited by examiner

*Primary Examiner*—Anthony Weier
(74) *Attorney, Agent, or Firm*—Allen Dyer Doppelt Milbrath & Gilchrist

(57) ABSTRACT

A method is provided for producing a grapefruit-juice-based beverage that does not contain compounds in sufficient quantity to inhibit the intestinal CYP3A4 enzyme in vivo. The method includes the steps of clarifying grapefruit juice and treating the resulting clear serum with an absorption resin to remove soluble coumarins and furanocoumarins.

16 Claims, No Drawings

GRAPEFRUIT-JUICE-BASED BEVERAGE PREPARATION METHOD FOR THE ELIMINATION OF DRUG ABSORPTION INTERACTION

BACKGROUND OF THE INVENTION

1. Field of the Invention

The present invention relates to methods for processing a grapefruit-based beverage to eliminate a drug absorption interaction.

2. Related Art

Reports have appeared in the literature of an interaction between grapefruit juice and several prescription drugs. Grapefruit juice contains components that inhibit an intestinal enzyme called CYP3A4, which, in the intestinal tract, functions to assist in the metabolism of some drugs. When CYP3A4 is inhibited, drugs normally metabolized by this enzyme are more bioavailable, resulting in more of the affected drug being absorbed. Current data indicate that furanocoumarins and furanocoumarin dimer compounds present in grapefruit juice are primarily responsible for the interaction. Coumarins and naringin may also play a minor role.

SUMMARY OF THE INVENTION

The present invention includes a method for producing a grapefruit-juice-based beverage from which compounds that inhibit the intestinal CYP3A4 enzyme in vivo have been substantially removed.

The method comprises the steps of clarifying grapefruit juice and treating the resulting clear serum with an absorption resin to substantially remove soluble coumarins and furanocoumarins.

DETAILED DESCRIPTION OF THE PREFERRED EMBODIMENTS

A description of the preferred embodiments of the present invention will now be presented.

As stated above, the present invention is directed to a method for producing a grapefruit-juice-based beverage, preferably containing $\geq$10% grapefruit solids, from which compounds that inhibit the intestinal CYP3A4 enzyme in vivo have been substantially removed.

The invention comprises the step of clarifying grapefruit juice and treating the resulting clear serum with a food-grade absorption resin to remove soluble coumarins and furanocoumarins. Optionally, naringin and other flavonoids may also be removed if desired. The clarification step comprises removing particulate materials present in the juice by ultrafiltration equipment using methods well known in the art. Alternatively, particulates may be removed by any means that separates particulates larger than 1 µm in size from the serum.

The resin materials to remove the furanocoumarin components may comprise, for example, cross-linked food-grade styrene divinylbenzene absorption resins that have not been modified to contain ion-exchange functional groups, although this is not intended as a limitation. Such resins are well known in the art. A preferred resin material composition comprises XAD-16, a 16% cross-linked styrene divinylbenzene resin (Koch Membranes, Inc., New Bedford, Mass.). The clarified juice serum is run through the resin bed in excess of 120 column volumes such that the flavonoids saturate the column and are flushed back into the grapefruit juice while the furanocoumarin components (6,7-dihyrdoxybergamottin, etc.) are still retained by the resin bed.

The procedure is designed such that the furanocoumarin components are preferably reduced to below 0.5 ppm for 6,7-dihydroxybergamottin and below 0.1 ppm for bergamottin. The furanocoumarin dimers are removed to below 0.05 ppm, as measured by HPLC with uv detection at 310 nm and measured using bergamottin as a standard.

The resulting clarified and treated juice stream can be used alone or in combination with a coumarin, furanocoumarin, and furanocoumarin dimer-free grapefruit flavor package. The clarified and treated juice may also be used, with or without the flavor package, in combination with a particulate fraction that also does not contain coumarins, furanocoumarins, or furanocoumarin dimers. The particulate fraction used could be pulp and cloud removed from the grapefruit juice to produce the clear serum and treated as a continuous or batch process to remove the entrained nonsoluble coumarins, furanocoumarins, and furanocoumarin dimers. Optionally, a particulate or cloud fraction from the fruit of another citrus variety that does not contain naturally occurring coumarins, furanocoumarins, or furanocoumarin dimers could be used. Such a source for pulp and cloud may comprise oranges, using the pulp and cloud removed in the processing of oranges into juice. Another option for producing a grapefruit beverage would be to use a particulate or cloud fraction from another food source that does not contain appreciable amounts of coumarins, furanocoumarins, or furanocoumarin dimers to cause inhibition of the intestinal CYP3A4 enzyme in vivo.

It is believed that the resulting beverage produced by the method of the present invention would be beneficial for consumers taking statins, calcium channel blocker drugs, or other potentially affected medications.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the method illustrated and described herein are by way of example, and the scope of the invention is not limited to the exact details of the method steps or the apparatus used.

What is claimed is:

1. A method for removing a CYP3A4-enzyme-inhibiting composition from a grapefruit-based liquid comprising the steps of:
    clarifying grapefruit juice to form a substantially clear serum; and
    passing the serum through an absorption resin adapted to remove soluble coumarins and furanocoumarins therefrom;
    wherein the serum-passing step comprises running the serum through the resin such that flavonoids saturate the column and return to the serum and the coumarins and furanocoumarins are retained on the resin.

2. The method recited in claim 1, wherein the clarifying step comprises applying ultrafiltration to the grapefruit juice.

3. The method recited in claim 1, wherein the clarifying step comprises removing particulates larger than approximately 1 µm from the grapefruit juice.

4. The method recited in claim 1, wherein the absorption resin comprises a food-grade absorption resin.

5. The method recited in claim 1, wherein the absorption resin is further adapted to remove naringin and at least one additional flavonoid.

6. The method recited in claim 1, wherein the absorption resin comprises a cross-linked stryrene divinylbenzene absorption resin.

7. The method recited in claim 6, wherein the absorption resin comprises a 16% cross-linked styrene divinylbenzene resin.

8. The method recited in claim 1, wherein the serum-passing step comprises running the serum through the resin in excess of 120 column volume.

9. The method recited in claim 1, wherein the serum-passing step comprises reducing furanocoumarin components to a level below 0.5 ppm for 6,7-dihydroxybergamottin and below 0.1 ppm for bergamoftin.

10. The method recited in claim 1, further comprising the step, following the serum-passing step, of adding a flavor package to liquid emerging from the resin.

11. The method recited in claim 1, further comprising the step, following the serum-passing step, of adding a particulate fraction to liquid emerging from the resin.

12. The method recited in claim 11, wherein the particulate fraction comprises at least one of a pulp and a cloud fraction.

13. The method recited in claim 11, wherein the particulate fraction comprises a particulate fraction from a food source substantially free from naturally occurring coumarins, furanocoumarins, and furanocoumarin dimers.

14. The method recited in claim 13, wherein the food source comprises a citrus juice.

15. The method recited in claim 14, wherein the citrus juice comprises orange juice.

16. The method recited in claim 1, further comprising the steps, following the clarifying step, of:
  removing entrained nonsoluble coumarins, furanocoumarins, and furanocoumarin dimers from a particulate fraction resulting from the clarifying step to form a modified particulate fraction; and
  adding the modified particulate fraction to liquid emerging from the resin.

\* \* \* \* \*